United States Patent [19]

Lejeune et al.

[11] Patent Number: 4,592,845

[45] Date of Patent: Jun. 3, 1986

[54] SLUDGE BELT METHOD OF CLARIFYING A LIQUID CHARGED WITH SOLID MATTER

[75] Inventors: Pierre Lejeune; Louis Berthod, both of Grenoble, France

[73] Assignee: Alsthom-Atlantique, Paris, France

[21] Appl. No.: 760,861

[22] Filed: Jul. 31, 1985

[30] Foreign Application Priority Data

Jul. 31, 1984 [FR] France .................. 84 12142

[51] Int. Cl.⁴ .................................. C02F 1/52
[52] U.S. Cl. .................. 210/715; 210/519; 210/208; 210/525; 210/528
[58] Field of Search ........... 210/715, 208, 205, 207, 210/519, 521, 525, 528, 534, 220

[56] References Cited

U.S. PATENT DOCUMENTS

| | | | |
|---|---|---|---|
| 2,380,252 | 7/1945 | McBride | 210/715 |
| 3,313,725 | 4/1967 | Koh Tsuda et al. | 210/715 |
| 3,850,810 | 11/1974 | Teodoroiv | 210/208 |
| 4,054,514 | 10/1977 | Oltmann | 210/715 |
| 4,278,541 | 7/1981 | Eis et al. | 210/208 |
| 4,390,429 | 6/1983 | Lejeune et al. | 210/519 |

*Primary Examiner*—Benoit Castel
*Attorney, Agent, or Firm*—Sughrue, Mion, Zinn, Macpeak & Seas

[57] ABSTRACT

The present invention provides a sludge belt method of clarifying a liquid charged with solid material. After a flocculation additive has been added thereto, the charged liquid is conveyed to the bottom of a sludge belt in a clarification chamber (40) via a plurality of injectors (76) spread out over the area of said chamber. The total flow rate through said injectors is evenly distributed between the injectors by an internal head loss. The clarified liquid is removed via an upper overflow (72). Each injector forms jets diverging from its vertical axis, so that the injected flow spreads out over an expansion zone belonging to said injector and meeting the expansion zones of adjacent injectors. In addition, the jets drive vortices which prevent the formation of a layer of sludge having insufficient permeability.

4 Claims, 7 Drawing Figures

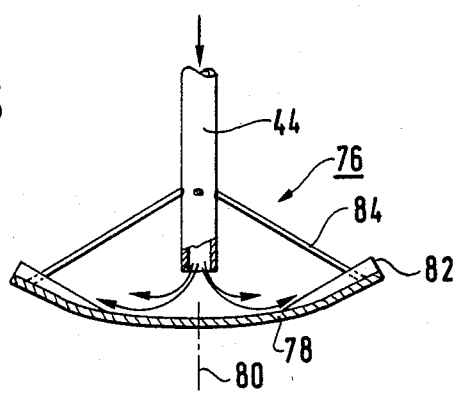
FIG. 3
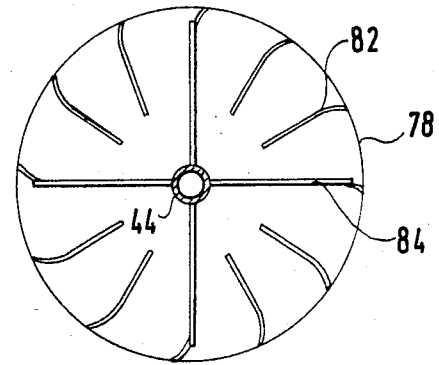
FIG. 4
FIG. 5
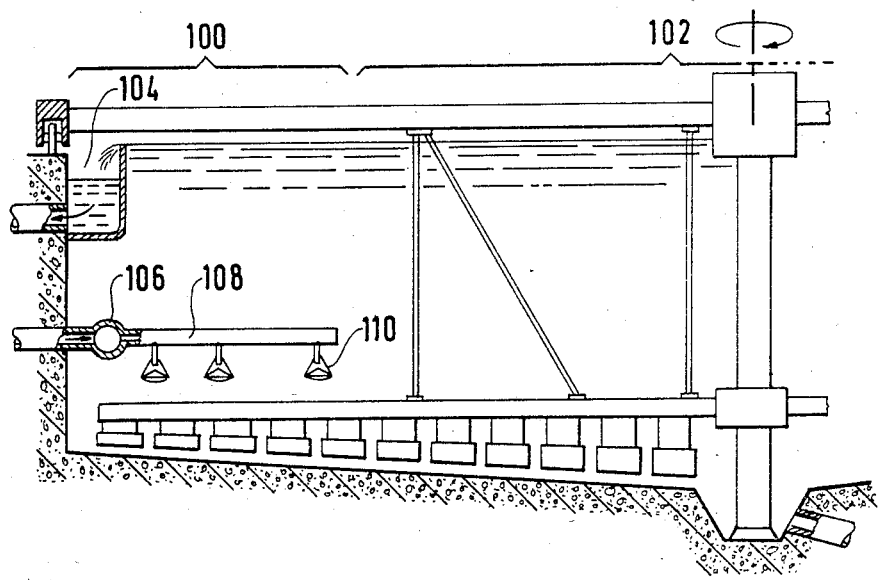

SLUDGE BELT METHOD OF CLARIFYING A LIQUID CHARGED WITH SOLID MATTER

FIELD OF THE INVENTION

The invention relates to clarifying liquids charged with fines in suspension.

BACKGROUND OF THE INVENTION

Liquids to be clarified by the method of the invention are generally waters occuring at the outlet from an industrial process and intended, for example, either for further industrial use or else for rejection into the public waste system or the ground. Although the following description refers to practical examples in which the method is implemented with waste water from the minerals or papermaking industries, the method may naturally be applied to clarifying a wide variety of charged liquids.

Heretofore, the methods used have required relatively long periods of time to separate and sediment out solid particles in suspension so as to obtain a liquid or water which is sufficiently clarified to meet the standards laid down. This arises because the vertical settling speed does not exceed a few meters per hour, and necessitates the use separator equipment which is expensive, and of large size and volume.

It is widely known that in order to increase the rate at which solid particles settle it is necessary to link up the particles in suspension. To this end, a small quantity of additive is added to the charged liquid in order to initiate the flocculation phenomenon. This forms agglomerates or flakes of considerably greater size than the particles from which they are built up.

Generally, after flocculation, the liquid and its charge of flakes of different sizes is injected at an intermediate level into the sole compartment of a clarification and settling apparatus of the "single stage" type. This compartment contains flakes at a higher concentration. This makes it possible to accelerate the increase in flake size and consequently to increase the settling speed. The flakes which have settled in the lower portion of the settling zone in this compartment are concentrated and they are removed (generally continuously, but sometimes in a discontinuous manner) in the form of a sludge which is more or less concentrated, and with a suitably determined average flow rate. The clarified liquid is removed at the same time from the top of the settling device from which it merely overflows.

It is also known that the two functions of clarifying the liquid and concentrating the solid can be obtained more rapidly by separating the functions so that they take place in distinct parts of the apparatus. The apparatus is then said to have two stages. The stages may be superposed with the clarification stage being above the concentration stage, or they may be concentric, or they may be side-by-side.

It is known that the flocculation phenomenon as initiated by flocculation additives forms agglomerates whose mechanical cohesion is low, and that hydraulic movements in the clarification zone may have both advantageous and disadvantageous effects simultaneously on the structure and the physical characteristics of the agglomerates.

Speeds which are too high in some portions of the apparatus break up prior formed flakes: the finally formed flakes have too wide a range of sizes including many very fine agglomerates which settle poorly. Speeds which are too slow in other portions of the apparatus enable flakes to form which are too big and which agglomerate with one another. These flakes then form continuous layers of low permeability which slow down the passage of the liquid to be clarified. Instability phenomena then occur with some zones being formed in which the liquid moves at high speeds that destroy the flakes.

More particularly, a first known clarification method applicable to a liquid charged with fine particles comprises the following operations:

adding a flocculation additive to a charged liquid to cause those of said fine particles which meet one another to bind together and form flakes;

substantially continuously inserting said mixture into a distribution chamber having substantially uniform pressure and inserting said mixture into a clarification chamber via a plurality of injectors distributed over the surface of said chamber, at the bottom thereof;

removing clarified liquid via a liquid-removal orifice in the upper portion of said chamber; and removing sludge via a sludge-removal orifice situated further down.

The charged liquid injection rate is selected in such a manner as to form a belt of sludge above the injectors with the charged liquid rising through said belt between flakes which have already been formed, and the fine particles still in suspension in said water binding to said flakes in order to increase the volume thereof so that the liquid arrives clarified above said belt of sludge and so that a layer of clarified liquid forms above the belt of sludge.

Each of said injectors is provided with guide means.

This known method is described in French Pat. No. 2 477 896 (Ghezail et al.). More particularly, it includes the following characteristics:

The injectors are injection orifices through the floor of the clarification chamber, and the said guide means are funnel-shaped elements flaring upwardly from said orifices. In each horizontal plane passing through such a funnel, the cross-section of the passage allowed to the injected charged water is, according to said patent (page 5, lines 1-5), constituted by the entire interior of the funnel, thereby very rapidly reducing the speed of said water after it leaves the injection orifices. This is the desired result, since in this method it is desired above all that the belt of sludge above the injection orifices should be substantially free from agitation. In practice, once the liquid passes through the injection orifice at any substantial speed, an axial cylindrical jet is formed at a distance from the walls of the funnel. Further, in this method, the sludge is partially removed on a temporary basis in a periodic manner through the injection orifices by applying temporary suction thereto and causing the flow direction through the injection orifices to be temporarily and suddenly reversed. The walls of the funnels then appear to constitute means for guiding the sludge towards said orifices. These brief periodic reversals of charged water flow direction prevent, to some extent, the formation of a continuous and insufficiently permeable layer which would cause the above-mentioned instability phenomena to appear.

A second known method makes it possible to avoid, to some extent, the formation of a continuous and insufficiently permeable layer of sludge. This method is described in French Pat. No. 1 115 038 (Degremont) and makes use of periodic temporary accelerations in the flow of charged water through the injection orifices.

A third method is known from French Pat. No. 2 431 317 (Dorr Oliver) corresponding to U.S. Pat. No. 4,263,137 (Kos). This method uses moving injectors including funnel-shaped guide means which serve to slow down and to distribute the flow of injected charged water.

A fourth known method is described in German patent specification 2,238,959 (H. Scheven).

In that method, the mixture of charged liquid and flocculation agent is inserted into a clarification chamber via a plurality of injectors distributed over the area of the chamber with each of the injectors forming a downwardly directed vertical jet towards a cup-shaped deflector. The deflector divides the jet and spreads it radially and upwardly, i.e. towards a sludge belt. It is specified that the association of said cups with said injectors creates "a slow uniform upward current". This method does not appear to have been developed industrially.

The object of the present invention, during the implementation of a clarification method of the above-mentioned type, is to increase, in a simple manner, the average speed at which the rising liquid passes through the sludge belt and/or to treat charged liquid containing a higher concentration of solid material, while still retaining efficient separation with the same type of solid particles, and using the same type of flocculation additive at the same concentration relative to the mass of solid material.

Any increase in said average rising speed gives rise to an increased flow rate of treated charged liquid through an installation of given area, or alternatively, for a given flow rate of liquid to be treated, it gives rise to a reduction in the area required by the installation. When a high flow rate of liquid is to be treated, such a reduction in the area of the installation constitutes an important economic advantage.

SUMMARY OF THE INVENTION

The present invention provides a sludge belt method of clarifying a liquid charged with solid material, said method being applied to a liquid charged with fine particles in suspension to provide both a clarified liquid and a sludge, said method comprising the following operations:

adding a flocculation additive to said charged liquid to make a mixture in which those of said fine particles which meet one another to bind together and form flakes;

substantially continuously inserting said mixture into a distribution chamber (42) having substantially uniform pressure and which conveys said mixture into a clarification chamber (40) via a plurality of injectors (44) distributed over the surface of said chamber, and each having an axis (80);

removing clarified liquid via a liquid-removal orifice (72) in the upper portion of said clarification chamber (40);

removing sludge from said clarification chamber via at least one sludge-removal orifice (50, 52) situated substantially further down than said liquid removal orifice (72);

said injectors (44) being likewise situated further down than said liquid-removal orifice (72), and the charged liquid injection rate being selected in such a manner as to form a belt of sludge above the injectors with the charged liquid rising through said belt between flakes which have already been formed, and the fine particles still in suspension in said water binding to said flakes in order to increase the volume thereof so that the liquid arrives clarified above said belt of sludge and so that a layer of clarified liquid forms above the belt of sludge;

each of said injectors (44) being provided with guide means (78);

said method being characterized by the fact that, between the distribution chamber (42) and the outlet from each of the said injectors (44), an internal head loss is established which is greater than a minimum value, and which is substantially equal at each of said injectors, said minimum value being equal to the bottom pressure difference between two columns of liquid having the same height as the maximum height of the sludge belt above the injectors, one of said columns being constituted by clear liquid and the other being constituted by the densest sludge likely to be formed in the sludge belt, thereby imposing substantially uniform distribution to the flow rate of charged liquid through the various injectors in spite of the beginnings or irregularity which occur spontaneously in said sludge belt;

said injector (44, 112) guide means (78, 114) are so disposed that the injected flow of charged liquid forms jets which diverge away from the injector axes (80); and the pressure and/or height of the charged liquid in the distribution chamber (42) is chosen to impart an injection speed to said jets sufficient for forming, under said sludge belt and on either side of the axis of each injector, primary vortices (W1) moving initially away from the injector axes up to the edges of injector expansion zones, then rising, and then returning towards the injector axes in order to provide controlled agitation in the lower layers of said sludge belt, the distance between adjacent injectors being chosen so that said expansion zones meet one another and occupy substantially the entire area of the clarification chamber under the sludge belt. (Reference symbols in parentheses refer to the FIGS. merely by way of example).

It is advantageous to use injectors having a sufficiently large minimum passage for charged water to avoid said passages becoming clogged, while nevertheless ensuring the said internal head loss. The following injectors appear to be the most effective from this point of view.

The said internal head loss generally lies in the range 3% to 20% of the maximum height of the sludge belt.

It must naturally be understood that the said diverging jets may have various shapes such as circularly symmetrical conical sheets, plane sheets, or multiple solid cylindrical jets at inclined at various angles to the injector axis.

It has further appeared to be advantageous to adopt, at least in some circumstances, the following more specific dispositions:

On average, said diverging jets leaving each injector are at an angle relative to the injector axis of more than 25°, and preferably of more than 60°.

Each injector comprises firstly a length of tube which receives the charged liquid from the distribution chamber after said internal head loss has been applied thereto and which forms a substantially vertical primary jet of charged liquid, and secondly a deflector which receives the primary jet, which divides it and which spreads it radially to form said divergent jets.

The said deflector is circularly symmetrical about the axis of the injector. In some cases it may be provided with fins distributed about its circumference and each extending both vertically and in a horizontal direction inclined relative to a radius to obtain a circumferential speed component in the speed of each of the said divergent jets, and to establish swirling motion about a vertical axis in the injector expansion zone suitable for encouraging divergence.

The dispositions according to the present invention make it possible to control the set of hydraulic motions in the various parts of the apparatus in such a manner as to form the densest possible flakes of adequate size, e.g. 1 to 10 mm, and to ensure that liquid contains practically no more nonflocculated fine material in suspension.

An implementation of the invention is described more particularly in greater detail below by way of non-limiting example with reference to the accompanying diagrammatic figures. It must be understood, that without going beyond the scope of the invention, the items described and shown may be replaced by other items, providing the same technical functions. When the same item is shown in several figures, it is designated by the same reference sign in all of them.

BRIEF DESCRIPTION OF THE DRAWINGS

FIG. 3 is a section on a vertical plane passing through the vertical axis of an injector of the FIG. 1 apparatus.

FIG. 4 is a plan view of the FIG. 1 injector.

FIG. 5 is a half-section on a plane passing through the vertical axis of a second apparatus for performing the invention.

DESCRIPTION OF THE PREFERRED EMBODIMENTS

The following description is particularly adapted to the requirements of the papermaking industry. It comprises two concentric stages.

Two zone concentric settling tanks comprising a peripheral primary sludge belt settling stage or tank following by central secondary sludge-thickening stage or tank are known, and are described in particular in U.S. Pat. No. 4,390,429 (Lejeune et al.). They may be used, for example, for treating papermaking effluent water at a flowrate of 1500 m³/h, in which case the settling tank has a diameter of 25 meters (m).

When much larger capacities are to be treated, the limiting feature is the capacity of the peripheral tank whose bottom slopes like a portion of an inverted cone, and it becomes necessary to resort to three concentric tanks or to considerably increase the depth of the settling tank.

The present invention increases settling speed and allows greater flow rates of liquid and/or solid material to be treated while simplifying the installation.

Figure 1:
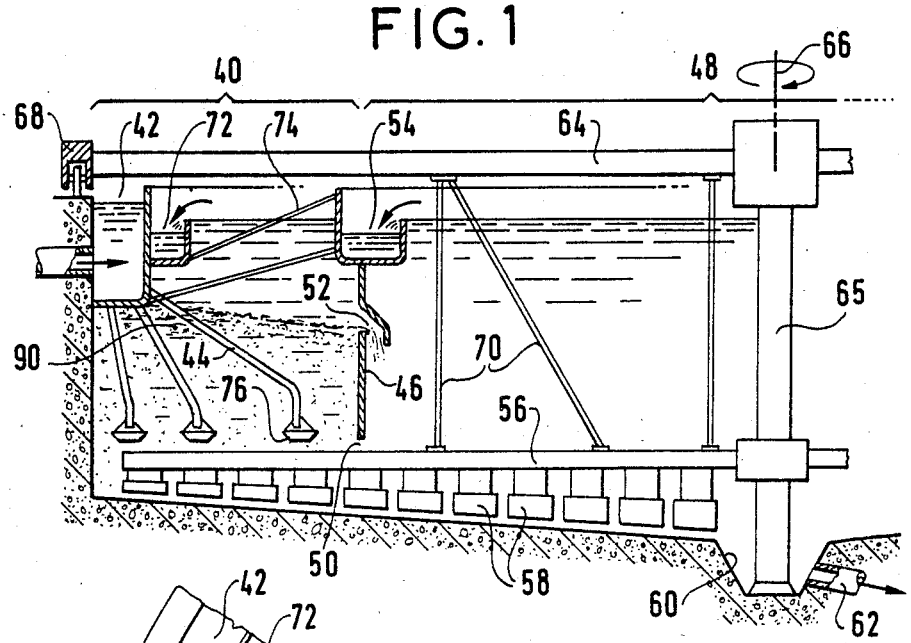
FIG. 1 is a half-section on a plane passing through the vertical axis of a first apparatus for performing the invention.
Figure 2:
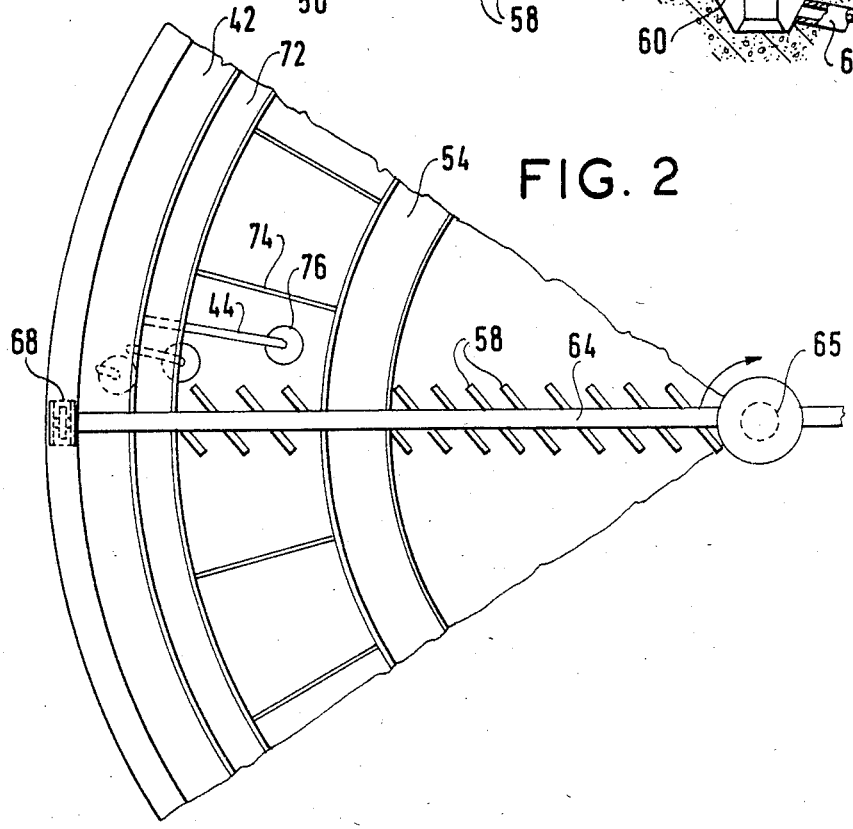
FIG. 2 is a plan view of a portion of the FIG. 1 apparatus.

The first apparatus for performing the invention to this end comprises an annular peripheral primary sludge belt stage 40 having a substantially flat bottom; this stage is fed with charged liquid from an annular distribution chamber 42 via dip tubes 44 which provide the said internal head loss in order to ensure uniform distribution of the fluid. This head loss comes from the length of the tubes, which length is substantially the same for all of the tubes (unlike the lengths shown). A separator wall 46 delimits a central sludge-thickening tank 48 which constitutes the secondary stage. This wall includes lower openings 50 and upper openings 52 which allow the sludge to flow from the settling tank to the central thickening tank (FIGS. 1 and 2).

The cylindrical wall 46 between the two tanks is suspended from a floating overflow channel 54 which collects clarified water from the secondary stage 48. Rotary arms 56 fitted with inclined scrapers 58 and located at the bottom of the central thickening tank can thus extend directly into the peripheral portion to clean out the bottom of the settling tank. These scrapers drive the thick bottom sludge towards a central outlet sump 60 fitted with a sludge removal pipe 62. The bottom of these two tanks slopes slightly towards the central sump. A shaft 65 stands on the bottom of the sump and interconnects the radial bottom arms 56 with horizontal radial top arms 64 located above the water. The shaft extends along the vertical axis 66 of the apparatus. Rotation is provided continuously by a carriage 68 running slowly round a peripheral upper running track. Rods 70 also drivably interconnect the top arms 64 to the bottom arms 56.

A peripheral overflow channel 72 collects clarified water from the settling tank 40. The channel 54 is held in place by rods 74.

Those of the tubes 44 which are not rectilinear, or substantially rectilinear, may be provided, at each bend, with openings which are closed by removable stoppers, so as to enable them to be cleared by rigid pipe-rods whenever they become blocked by agglomerations of fibers. (Other means of clearing include cleaning jets from hunting heads, or systems making use of moving balls).

The area of the primary stage in horizontal projection lies in the range 35% to 65% of the area of the secondary stage.

The top level of the sludge belt is slightly above the upper openings 52 which act as an overflow.

The dip tubes 44 terminate at their bottom ends in injectors 76 (only three of which are shown) which are distributed over the entire area of the settling stage 40 beneath the sludge belt, but above the arms 56.

These injectors 76 are described with reference to FIGS. 3 and 4. Each comprises an end length of a tube 44, which forms a downwardly directed vertical jet along an axis 80.

A deflector 78 shaped like a coaxial concave cup which receives the jet and spreads it out radially and deflects it slightly upwardly. The above-mentioned diverging jets are thus formed, in this case in the form of respective continuous upwardly directed sheets. The above-mentioned fins 82 give these jets a circumferential component of speed about the axis 80. The deflectors 78 are suspended from the tube 44 by rods 84. It must be understood that, depending on the material of the solid particles in the charged liquid and on their concentration, the speed of the vertical primary jet may be chosen to be greater or smaller to form the above-mentioned vortices, which can be observed in test chambers having transparent walls. The speed may be adjusted without changing the cross section of the tubes 44, which in any case is selected to ensure the desired internal head loss, by disposing a small angle (in the range about 7° to about 12°) nozzle at the end of the tube 44. The nozzle should be divergent to reduce the speed or convergent to increase it. The internal head loss should not, in general, be formed using a diaphragm or the like, since that would set up high speeds liable to break up flakes, and would also run the risk of clogging.

Figure 6:
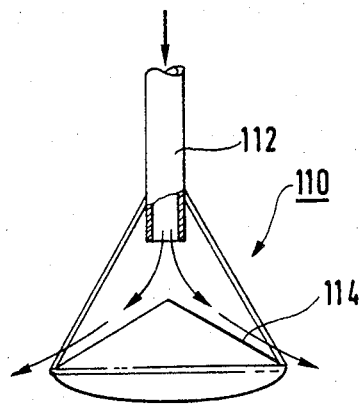
FIG. 6 is a section on a plane passing through the vertical axis of an injector of the FIG. 5 apparatus.

It is also possible for the deflector to be constituted by a cone, as shown in FIG. 6, or by the bottom of the settling tank.

It is clear that analogous injectors could be used if the stages were of some other shape, e.g. rectangular.

In a second apparatus, analogous to the first embodiment and shown in FIG. 5, the wall between the peripheral primary settling stage 100 and the central secondary thickening stage 102 is omitted. Clarified water is removed solely via the peripheral overflow channel 104.

Figure 7:
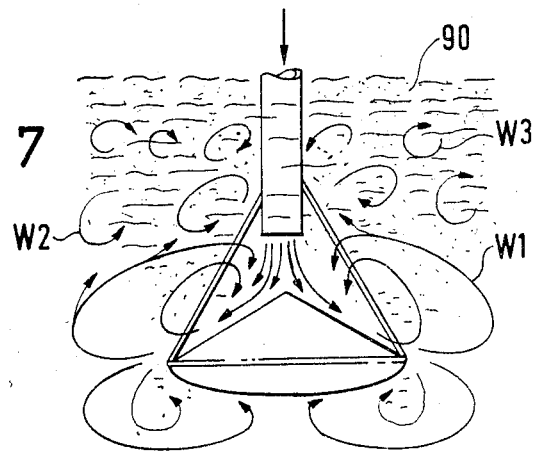
FIGS. 7 is a highly diagrammatic view of vortices created in the sludge belt by an injector of the FIG. 5 apparatus.

The distribution chamber is constituted by a circular duct 106 feeding radial immersed ducts 108 which in turn feed injectors 110. One of these injectors is shown in FIG. 6. It comprises a tube 112 forming a downwardly directed vertical primary jet, and a deflector 114 which is in the shape of a coaxial cone having its vertex uppermost and a downwardly directed curved convex base. The deflector is held in place by rods. The said diverging jets lie along the generator lines of the cone, i.e. they constitute a downwardly directed conical sheet. The primary vortex formed thereby is shown at W1 in FIG. 7. It creates secondary vortices W2 of smaller size above itself, and higher up it creates tertiary vortices W3 which are smaller and even slower. These vortices homogenize the sludge belt substantially without breaking up the flakes. The energy of the vortices dissipates progressively. The vortices ares superposed on an average uniform upwards motion.

When treating papermaking effluents, the second apparatus described above is capable of operating under the following conditions (approximate values are given):
average concentration of solid material in the water to be clarified: 2 g/l
sludge belt concentration: 50 g/l
concentration in clarified water: 20 mg/l
speed at which the water rises through the sludge belt 3 m/h (compared with 2 m/h in the prior art;
inside diameter of the tubes 44 (throughout): 50 mm
head loss due to the length of these tubes: 250 mm water column
distance between adjacent tubes: 1 to 2 m.
The flocculation agents used were conventional for this type of operation, and they were used at the usual concentrations.

We claim:

1. A sludge belt method of clarifying a liquid charged with solid material, said method being applied to a liquid charged with fine particles in suspension to provide both a clarified liquid and a sludge, said method comprising the following operations:
    adding a flocculation additive to said charged liquid to make a mixture in which those of said fine particles which meet one another bind together and form flakes;
    substantially continuously inserting said mixture into a distribution chamber (42) having substantially uniform pressure and which conveys said mixture into a clarification chamber (40) via a plurality of injectors (44) distributed over the surface of said chamber, and each having an axis (80);
    removing clarified liquid via a liquid-removal orifice (72) in the upper portion of said clarification chamber (40);
    removing sludge from said clarification chamber via at least one sludge-removal orifice (50, 52) situated substantially further down than said liquid removal orifice (72);
    said injectors (44) being likewise situated further down than said liquid-removal orifice (72), and injecting the mixture at a selected rate such as to form a belt of sludge above the injectors whereby the mixture rises through said belt between flakes which have already been formed, and the fine particles still in suspension in said mixture bind said flakes and increase the volume thereof, and forming a layer of clarified liquid above the belt of sludge;
    each of said injectors (44) being provided with guide means (78) defining an expansion zone
    establishing between the distribution chamber (42) and the outlet from each of the said injectors (44), an internal head loss which is greater than a minimum value, and which is substantially equal at each of said injectors, said minimum value being equal to the bottom pressure difference between two columns of liquid having the same height as the maximum height of the sludge belt above the injectors, one of said columns being constituted by clarified liquid and the other being constituted by the densest sludge likely to be formed in the sludge belt, thereby imposing substantially uniform distribution to the flow rate of charged liquid through the various injectors in spite of the beginnings of irregularity which occur spontaneously in said sludge belt;
    said injector (44, 112) guide means (78, 114) are so disposed that the injected flow of charged liquid forms jets which diverge away from the injector axes (80); and
    the pressure and/or height of the mixture in the distribution chamber (42) being chosen to impart an injection speed to said jets sufficient for forming, under said sludge belt and on either side of the axis of each injector, primary vortices (W1) moving initially away from the injector axes up to the edges of injector expansion zones, then rising, and then returning towards the injector axes in order to provide controlled agitation in the lower layers of said sludge belt, the distance between adjacent injectors being selected such that said expansion zones meet one another and occupy substantially the entire area of the clarification chamber under the sludge belt.

2. A method according to claim 1, wherein said diverging jets leaving each injector (44) are at an angle relative to the injector axis (80) of more than 25°.

3. A method according to claim 1, wherein each injector (76) comprises firstly a length of tube (44) which receives the charged liquid from the distribution chamber after said internal head loss has been applied thereto and which forms a substantially vertical primary jet of charged liquid, and secondly a deflector (78) which receives the primary jet, which divides it and which spreads it radially to form said divergent jets.

4. A method according to claim 3, wherein said deflector (78) is circularly symmetrical about the axis of the injector and is provided with fins (82) distributed about its circumference, and each fin extends both vertically and in a horizontal direction inclined relative to a radius to obtain a circumferential component of speed to each of the said divergent jets, and to establish swirling motion about a vertical axis (80) in the injector expansion zone (78).

* * * * *